US008147574B2

(12) United States Patent
Montross

(10) Patent No.: US 8,147,574 B2
(45) Date of Patent: Apr. 3, 2012

(54) MATERIAL CONTAINING DIAMOND AND AN INTERMETALLIC COMPOUND

(76) Inventor: Charles Stephan Montross, Springs (ZA)

(*) Notice: Subject to any disclaimer, the term of this patent is extended or adjusted under 35 U.S.C. 154(b) by 165 days.

(21) Appl. No.: 12/515,744

(22) PCT Filed: Nov. 21, 2007

(86) PCT No.: PCT/IB2007/054729
§ 371 (c)(1),
(2), (4) Date: Aug. 7, 2009

(87) PCT Pub. No.: WO2008/062369
PCT Pub. Date: May 29, 2008

(65) Prior Publication Data
US 2010/0050536 A1    Mar. 4, 2010

Related U.S. Application Data

(60) Provisional application No. 60/866,636, filed on Nov. 21, 2006.

(51) Int. Cl.
B24D 3/02    (2006.01)
C09C 1/68    (2006.01)
C09K 3/14    (2006.01)

(52) U.S. Cl. ............................................. 51/309; 51/307
(58) Field of Classification Search .................. None
See application file for complete search history.

(56) References Cited

U.S. PATENT DOCUMENTS 3,268,457 A * 8/1966 Tydings et al. ............... 252/506
3,436,183 A * 4/1969 Takasu et al. ................. 423/446
3,442,615 A * 5/1969 Aoki et al. .................... 423/446
3,442,616 A * 5/1969 Takasu et al. ................. 423/446
3,457,043 A * 7/1969 Aoki et al. .................... 423/446
3,536,447 A * 10/1970 Takasu et al. ................. 423/446
3,745,623 A    7/1973 Wentorf et al.
3,773,903 A * 11/1973 Kuratomi ...................... 423/446
4,167,399 A * 9/1979 Lee et al. ........................ 51/307
4,171,339 A * 10/1979 Lee et al. ........................ 51/309

(Continued)

FOREIGN PATENT DOCUMENTS
EP    537004 A1 *    4/1993

OTHER PUBLICATIONS

Simonsen, I. et al., "Diamond formation in aluminium compressed with nickel-graphite under shock loading", Journal of Materials Science, vol. 27, No. 7, pp. 1735-1740, XP002478679, (1992).

Primary Examiner — Jerry Lorengo
Assistant Examiner — Ross J Christie
(74) Attorney, Agent, or Firm — Oblon, Spivak, McClelland, Maier & Neustadt, L.L.P.

(57) ABSTRACT

THIS INVENTION relates to a method of making a diamond containing material comprising diamond particles and a second phase containing an intermetallic compound comprising the steps of providing a reaction mass of reactants capable, on reaction, of producing carbon and an intermetallic compound and subjecting the reaction mass to diamond synthesis conditions. In an embodiment of the invention, the diamond containing material produced is polycrystalline diamond (PCD) and the reaction mass contains diamond particles in an amount sufficient to allow PCD to be produced. In a further embodiment of the invention, the diamond content in the diamond containing material produced does not exceed 70 volume %.

22 Claims, 1 Drawing Sheet

U.S. PATENT DOCUMENTS

| | | | |
|---|---|---|---|
| 4,242,106 A * | 12/1980 | Morelock | 51/307 |
| 4,650,776 A * | 3/1987 | Cerceau et al. | 51/307 |
| 4,789,385 A * | 12/1988 | Dyer et al. | 51/309 |
| 5,158,148 A | 10/1992 | Keshavan | |
| 5,453,105 A * | 9/1995 | Middlemiss et al. | 51/307 |
| 6,090,343 A * | 7/2000 | Kear et al. | 419/45 |
| 6,616,725 B2 * | 9/2003 | Cho et al. | 51/307 |
| 2008/0115424 A1 * | 5/2008 | Can et al. | 51/309 |

* cited by examiner

MATERIAL CONTAINING DIAMOND AND AN INTERMETALLIC COMPOUND

Cross-Reference to Related Applications

This application is a 371 of PCT/IB2007/054729 filed Nov. 21, 2007 and claims the benefit of U.S. provisional application 60/866,636 filed Nov. 21, 2006.

BACKGROUND OF THE INVENTION

This invention relates to a method of generating a diamond containing material (DCM).

Diamond-containing material (DCM) used extensively in cutting, milling, grinding, drilling and other abrasive operation, may take many forms, for example:

- a diamond matrix tool material, where the diamond particles are held together in a metallic or intermetallic matrix. These are typically formed at atmospheric pressure by sintering together the diamond-matrix mixture, and are generally characterised by diamond volume contents that are less than 70 volume %.
- abrasive compacts, that consist of a mass of ultrahard particles, typically diamond, bonded into a coherent, polycrystalline conglomerate. The abrasive particle content of these abrasive compacts is high, generally in excess of 70 volume %; and more typically in excess of 80 volume %. There is generally an extensive amount of direct particle-to-particle bonding or contact. Abrasive compacts are generally sintered under high pressure, high temperature (HpHT) conditions at which the diamond is crystallographically or thermodynamically stable. Diamond compacts are also known as PCD.

Abrasive compacts also usually have a second or binder phase. In the case of certain types of polycrystalline diamond compacts, this second phase is typically a metal such as cobalt, nickel, iron or an alloy containing one or more such metals. Examples of composite abrasive compacts can be found described in U.S. Pat. Nos. 3,745,623; 3,767,371 and 3,743,489.

When diamond particles are combined with a suitable metallic solvent/catalyst, this solvent/catalyst promotes diamond-to-diamond bonding between the diamond grains, resulting in an intergrown or sintered structure. This mechanism occurs in part because of the solubility of carbon in the solvent/catalyst which allows carbon from the diamond to dissolve and re-precipitate on other diamonds while in the diamond stable field during manufacture. This results in extensive diamond-to-diamond bonding, hence producing a strong diamond composite. In the final sintered structure however, solvent/catalyst material necessarily remains within the interstices that exist between sintered diamond grains.

A well-known problem experienced with this type of PCD compact however, is that the residual presence of solvent/catalyst material in the microstructural interstices has a detrimental effect on the performance of the compact at high temperatures. This decrease in performance under thermally demanding conditions is postulated to arise from two different behaviours of the compact. One is related to the differences between the thermal expansion characteristics of the interstitial solvent/catalyst and the sintered diamond network; which can cause micro-cracking when the material is heated above about 400° C. This micro-fracturing significantly reduces the strength of the bonded diamond of increased temperatures.

Additionally, the solvent/catalyst metallic materials which facilitate diamond-to-diamond bonding under high-pressure, high-temperature sintering conditions can equally catalyse the reversion of diamond to graphite at increased temperatures and reduced pressure with obvious performance consequences. This particular effect is mostly observed at temperatures in excess of approximately 700° C.

As a result, PCD sintered in the presence of a metallic solvent/catalyst, notwithstanding its superior abrasion and strength characteristics must be kept at temperatures below 700° C. This significantly limits the potential industrial applications for this material and the potential fabrication routes that can be used to incorporate them into tools.

Potential solutions to this problem are well-known in the art. One type of approach focuses on the use of alternative or altered sintering aid materials. These materials when present in the final sintered structure exhibit much reduced retro-catalytic efficacy at high temperatures and typically have thermal expansion behaviours better matched with those of the sintered diamond phase.

One of the methods of altering the binder phase material is through the use of complex metallic systems that can still facilitate a consolidation of the diamond compact but have reduced thermal degradation effects in the final product. Certain classes of intermetallics are examples of these. Intermetallic compounds are typically defined as solid phases that contain two or more metallic elements, with optionally one or more non-metallic elements, whose structure is distinct from that of any of the constituents. They usually have a characteristic crystal structure and usually a definite composition. In common use the research definition, including poor metals (aluminium, gallium, indium, thallium, tin and lead) and metalloids (silicon, germanium, arsenic antimony and tellurium), is extended to include compounds such as cementite, $Fe_3C$. The latter compounds, sometimes termed interstitial compounds can be stoichiometric, and share similar properties to the classical intermetallics.

U.S. Pat. No. 4,793,828 describes a diamond compact with a matrix phase that consists of silicon and/or silicon carbide. This compact is produced by infiltration from a silicon powder or foil source at elevated pressures and temperatures. This compact was found to be capable of withstanding temperatures of 1200° C. under a vacuum or in a reducing atmosphere without significant graphitisation or evidence of thermal degradation occurring.

U.S. Pat. No. 4,534,773 teaches the formation of a diamond compact with a binder phase comprising nickel silicides. This intermetallic binder phase is generated through the interaction/reaction between molten nickel and silicon at HpHT conditions. The material produced is claimed to be an improved thermally stable polycrystalline diamond compact.

U.S. Pat. No. 4,789,385 teaches silicon, silicon-nickel, and silicon-cobalt combinations that will form intermetallics during sintering such as silicon carbide or nickel silicides or cobalt silicides while bonding diamond in the diamond stable field. These silicides are stated to provide thermal stability to the polycrystalline diamond compact.

US 2005/0230156 revisits this topic of intermetallics with a focus on cobalt silicide (CoSi), and particularly cobalt disilicide ($CoSi_2$). It is claimed that these compounds, formed in situ, improve thermal stability behaviour due to having a lower thermal expansion coefficient than the cobalt metal binder commonly used. It is to be noted that this patent relies on consumption of SiC to form these intermetallics; and that certainly in the case of the disilicide, the reaction is not likely to proceed for thermodynamic reasons. The use of silicide intermetallics as binders for DCM's can have significant disadvantages. Silicides are known to be very brittle and can be a source of micro-cracking and flaws when used in an environment which is impact-prone, such as drilling or machining. The patent further discloses the proposed use of other intermetallics or alloys such as cobalt aluminides, borides, niobides, tantalides etc.

Whilst many of these intermetallic modified/alternative binder systems exhibit significantly increased thermal stability of the overall composite material with respect to diamond, a problem with their use in PCD materials comes from their inability to effect the appreciable diamond-to-diamond bonding that is characteristic of conventional metal solvent/catalysts. PCD materials manufactured using intermetallic-based systems therefore tend not to perform as optimally or effectively in certain demanding abrasive applications as the standard PCD materials; albeit that they exhibit improved thermal stability.

SUMMARY OF THE INVENTION

According to the present invention, there is provided an in situ method of making a diamond-containing material (DCM) comprising diamond particles and a second phase containing an intermetallic compound comprising the steps of providing a reaction mass of reactants capable, on reaction, of producing carbon and an intermetallic compound and subjecting the reaction mass to diamond synthesis conditions.

Still further according to the invention, the DCM may be of a type that contains levels of diamond that will not exceed 70 volume %, preferably that will not exceed 40 volume % or more preferably that will not exceed 30 volume %; or the DCM may be a PCD material, where the overall diamond content will then typically exceed 70 volume %, or more preferably exceed 80 volume %.

Where the final product is a DCM with a diamond content that does not exceed 40 volume %; the method of the invention includes the steps of subjecting the reagent species, or mixture thereof, to HpHT conditions; resulting in the formation of free carbon at diamond stable conditions; which is transformed into diamond because it is the thermodynamically preferred polymorph. The remaining phase or phases which would then constitute the binder or matrix is generated by the reaction; and comprises at least an intermetallic or similar material. The reaction mass may contain some diamond particles.

Where the final product is a PCD material with a binder phase that contains the intermetallic then the method of the invention includes the steps of providing a mass of diamond particles, in an amount sufficient to allow PCD to be produced, and reactants capable of producing carbon as a reaction product and subjecting the diamonds and the reactants to diamond synthesis conditions to produce polycrystalline diamond. The final product may be supported by a cemented carbide substrate. The carbide substrate may additionally have a similar or related intermetallic binder to that constituting the binder for the PCD layer.

The second phase of the DCM may contain more than one intermetallic compound and will preferably consist essentially of the intermetallic compound or compounds with any other elements present being in trace amounts only. The exact phase composition of the intermetallic second phase will be dependent on the conditions of synthesis i.e. equilibrium composition may not be achieved. Thus, the second phase may contain not only the intermetallic compound or compounds, but also some non-equilibrium phase or phases. For example, if the reactants are nickel and aluminium carbide then the second phase will contain some intermetallic compound, i.e. $Ni_2Al_3$ and possibly NiAl, and possibly some non-equilibrium complex aluminium rich phase. The extent of the non-equilibrium phase in the second phase will depend on the reaction conditions.

Diamond synthesis conditions are well known in the art. Typically, the elevated pressure and temperature conditions necessary for diamond synthesis are a temperature of at least 1300° C. and a pressure of at least 5 GPa.

DESCRIPTION OF EMBODIMENTS

Figure 1:
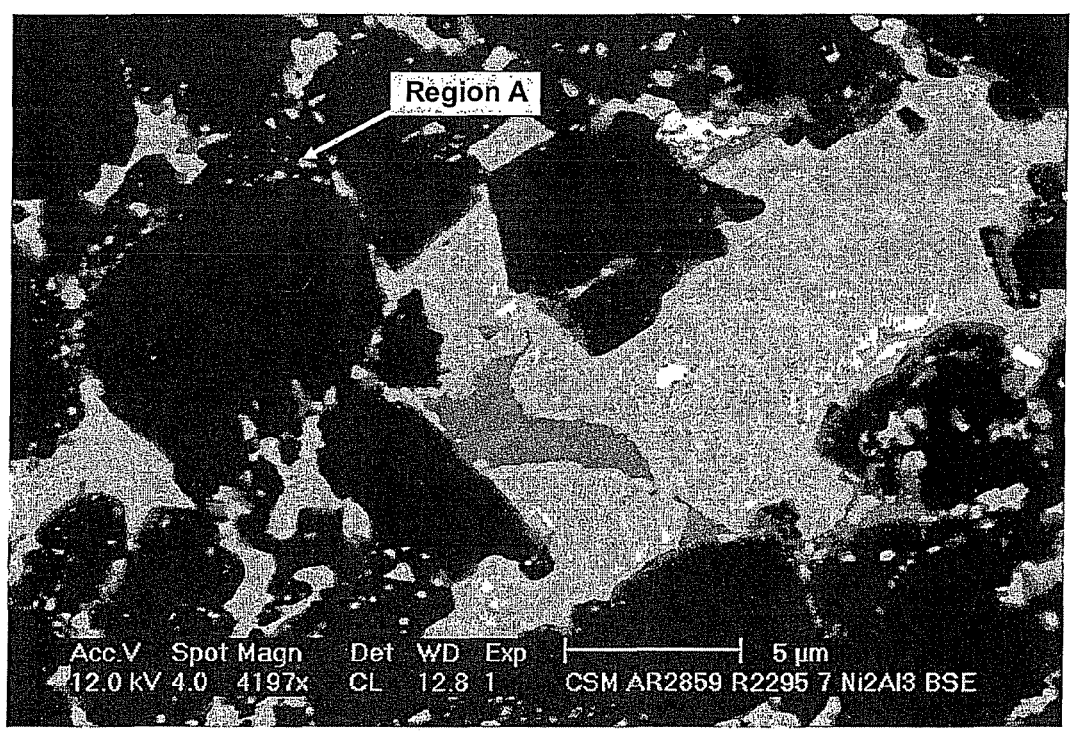
FIG. 1 represents a scanning electron backscatter image of material generated by example 1.

In the method of the invention use is made of metallic-based reactants, where at least one reactant will be a material containing carbon. These components or reactants react under HpHT conditions to produce free carbon, which is transformed to diamond because it is thermodynamically preferred. A further product of the reaction of the components is an intermetallic or related species which exhibits reduced reactivity towards diamond at higher temperatures, when compared to conventional catalyst/solvent metals.

The invention therefore according to a first aspect concerns the manufacture of polycrystalline diamond (PCD), also known as a diamond compact, which has substantial direct diamond-to-diamond bonding or bridging and a second phase which does not react with diamond, i.e. does not cause the graphitization of diamond under graphite stable conditions. The second phase contains an intermetallic compound which is formed during the high temperature/high pressure manufacture or sintering of the polycrystalline diamond.

The invention has particular application to polycrystalline diamond in which the intermetallic compound is a nickel aluminide, having an overall elemental stoichiometry of 2Ni: 3Al. Such an intermetallic compound may be formed under diamond synthesis conditions by reaction of nickel with aluminium carbide. The intermetallic compound preferably constitutes substantially all of the second phase; with the precipitate diamond provided by the reaction constituting the bulk of the diamond-to-diamond binding material in the PCD.

A method of making polycrystalline diamond therefore includes the steps of providing a mass of diamond particles and reactants capable of producing carbon as a reaction product and subjecting the diamonds and the reactants to diamond synthesis conditions to produce polycrystalline diamond.

Preferably, the intermetallic or similar type compound is substantially non-reactive to diamond. Thus, the carbon produced as one of the reaction products assists in creating diamond-to-diamond bonding in the polycrystalline diamond and the intermetallic compound renders the polycrystalline diamond thermally stable. The exact phase composition of the intermetallic binder can be complex because of the formation of non-equilibrium phases during cooling from sintering conditions. Hence, although the overall elemental stoichiometry will be consistent with a particular intermetallic composition, the existence of non-equilibrium phases may occur. For example, in the case of a $Ni_2Al_3$-based intermetallic second phase; the existence of the NiAl phase and complex aluminium-rich phases in addition to the $Ni_2Al_3$ phase is common, albeit that the overall elemental stoichiometry is 2Ni:3Al. This variation in local binder composition is not seen as detrimental to the material performance, as long as the phases formed are not reactive to diamond (on heating).

The reactants are preferably provided in particulate form for ease of handling; and are intimately mixed prior to incorporation into the HpHT reaction volume in order to ensure an effective reaction process.

The invention also provides a method of manufacturing a DCM material, containing no more than 70 volume % diamond which includes the steps of providing reactants capable of producing carbon as a reaction product and subjecting the reactants to diamond synthesis conditions to produce diamond crystals in an intermetallic-based second phase (matrix).

The amount of new or precipitated diamond generated in the structure will depend on the amount of free carbon generated by the reaction. Hence for certain reactions that generate larger amounts of free carbon, precipitated diamond levels of the order of 20 to 25 volume % may be anticipated. For reactions that generate lower amounts of free carbon, levels as low as 5 to 10 volume % of precipitated diamond may occur. It may also be that in some cases the complex nature of the intermetallics formed may include carbon/carbide phases; which may independently consume some of the free carbon generated.

In certain cases where a final product with lower levels of diamond content is preferred, i.e. where the dominant portion of the diamond content will be provided by free carbon precipitation; it may still be useful to introduce a number of diamond seed particles; or to augment the final diamond content by introducing diamond powder into the reactant mixture. Hence, the incorporation of diamond material into the reactant mixture may be at lower levels than would ordinarily be expected for the manufacture of PCD-type materials.

A further consideration which has been observed to be important to the successful formation of precipitated diamond relates to the molar volume changes as a result of the reactions occurring. It has been found by the inventors that even where certain reactions should be thermodynamically preferred i.e. free C and intermetallic formation should occur on HpHT treatment of certain reactant mixtures; any reaction that results in a significant increase in volume on formation of the products does not easily occur.

Reactions suitable for this invention include:

M in the following reactions is a metal, whilst x,y and z indicate the variable possible stoichiometries.

1. Aluminide-based carbon precipitation reactions—these involve the production of Group IVa (e.g. Zr, Hf, Ti), Va (e.g. V, Ta, Nb), VIa (e.g. Cr, Mo, W) and VIIa (e.g. Fe, Co, Cu, Ni) metal aluminides through reaction of the metal or a metal carbide with $Al_4C_3$. They have the general form:

$$M_z(C) + Al_4C_3 \rightarrow M_xAl_y + C_{diamond}$$

2. Modified aluminide carbon precipitation reaction— these are to the reactions of type 1, save that they include the addition of a further carbide material such as tungsten carbide (WC).

3. Silicide/boride/nitride carbon precipitation reactions— these involve the formation of an intermetallic silicide or similar boride or nitride structure. Group IVa and Va (e.g. titanium, vanadium, niobium and tantalum) silicides, borides or nitrides may be produced. These may have the general form:

a. silicides $$M_zC + SiC \rightarrow M_xSi_y + C_{diamond}$$

b. borides $$M_zC + B_4C \rightarrow M_xB_y + C_{diamond}$$

c. nitrides (type 1)

$$M_zN + SiC \rightarrow M_xC_y + Si_3N_4 + C_{diamond}$$

d. nitrides (type 2)

$$M_zN + Al_4C_3 \rightarrow M_xC_y + AlN + C_{diamond}$$

If the reactions set out above are carried out under diamond synthesis conditions then the carbon produced will precipitate as diamond, as indicated. It is further noted that these reaction types are not mutually exclusive; i.e. that it possible to carry out multiples of these reactions within a single reaction volume to get mixed intermetallic formation with associated diamond precipitation.

The invention will now be exemplified by the following non-limiting examples.

EXAMPLES

Example 1

Aluminide-Based Carbon Precipitation (in the Presence of Added Diamond)

In an example of the invention Ni and $Al_4C_3$ binder reactants were mixed with diamond grit and the mixture subjected to diamond synthesis conditions. A $Ni_2Al_3$ based diamond compact (PCD) containing a second phase of a complex intermetallic with the stoichiometry of $Ni_2Al_3$ (i.e. 2Ni:3Al) was formed, according to the reaction $$8Ni + 3Al_4C_3 \rightarrow 4Ni_2Al_3 + 9C$$

In order to achieve roughly 20 volume % $Ni_2Al_3$ intermetallic-based binder with diamond, 11.11 g Ni and 10.24 g $Al_4C_3$ were mixed with 78.65 g of diamond grit of approximately 12 μm in size.

Subjecting this mixture of components to diamond synthesis conditions resulted in an intergrown diamond compact containing a second intermetallic-based phase with a stoichiometry of 2Ni:3Al being produced. The compact was analysed using SEM (scanning electron microscopy) and evidence of precipitated diamond formation in the interstices between the larger diamond grains was observed. This can be seen in the region designated A in FIG. 1, a backscatter SEM image of the material generated in this example.

The diamond compact was analyzed by X-ray diffraction before and after heat treatment at 850° C. under vacuum for 2 hours. In the as-synthesised sample, the intermetallic-based binder had an overall elemental stoichiometry of 2:3 (Ni:Al) with the presence of some equilibrium $Ni_2Al_3$ phase and some non-equilibrium NiAl and complex aluminium-rich phases. In the heat-treated sample, there was no evidence of thermal degradation of the diamond compact and no $Al_4C_3$ was detected from reaction of the intermetallic-based binder with the diamond.

Example 2

Aluminide-Based Carbon Precipitation in the Absence of Added Diamond

A diamond containing material was produced by reacting nickel with aluminium carbide under diamond synthesis conditions. No diamond powder was added to the mixture prior to synthesis. The reaction is based on $$8Ni + 3Al_4C_3 \rightarrow 4Ni_2Al_3 + 9C$$

where for 52.09 g of Ni is mixed with 47.91 gms of $Al_4C_3$. The nickel and aluminium carbide reactants when reacted under diamond synthesis conditions of 5.5 GPa and a temperature preferably greater than 1450° C., yielded an intermetallic-based binder that had an overall elemental stoichiometry of 2:3 (Ni:Al) with the presence of some equilibrium $Ni_2Al_3$ phase and some non-equilibrium NiAl and complex aluminium-rich phases; together with a fine dispersion of diamond crystals in the binder phase. It is preferable that the $Al_4C_3$ was well mixed with the Ni powder to ensure a complete and homogeneous reaction while avoiding moisture that would decompose the $Al_4C_3$.

Example 3

Aluminide-Based Carbon Precipitation in the Presence of Further Carbides (No Added Diamond)

A diamond containing material was produced by reacting nickel with aluminium carbide under diamond synthesis conditions, in the presence of tungsten carbide powder. No diamond powder was added to the mixture prior to synthesis. The reaction is based on:

$$8Ni + 3Al_4C_3 + WC > 4Ni_2Al_3 + WC + 9C$$

The nickel, aluminium carbide and tungsten carbide powder reactants in the appropriate ratios (as per the reaction scheme above) were reacted under diamond synthesis conditions, yielding:
an intermetallic-based binder that had an overall elemental stoichiometry of 2:3 (Ni:Al) with the presence of some equilibrium $Ni_2Al_3$ phase and some non-equilibrium NiAl and complex aluminium-rich phases; together with a fine dispersion of diamond crystals in the binder phase
additional WC phase
The presence of diamond was confirmed with X-Ray diffraction.

Example 4

Silicide-Based Carbon Precipitation (No Added Diamond)

A diamond containing material was produced by reacting silicon carbide with tantalum carbide under diamond synthesis conditions. No diamond powder was added to the mixture prior to synthesis. The reaction is based on:

$$5TaC + 3SiC \rightarrow Ta_5Si_3 + 8C$$

The nickel, aluminium carbide and tungsten carbide powder reactants in the appropriate ratios (as per the reaction scheme above) were reacted under diamond synthesis conditions, yielding:
a fine dispersion of diamond crystals in the binder phase
an intermetallic-based binder with the stoichiometry of 5Ta:3Si, but where the non-equilibrium phases of $Si_5C_3$ and TaC were also observed.
The incomplete reaction of the TaC to form diamond was ascribed to the fact that the molar volume changed in this reaction was only slightly negative. The presence of diamond was confirmed with X-Ray diffraction.

The invention claimed is:
1. A method of making a diamond containing material comprising diamond particles and a second phase containing an intermetallic compound comprising providing a reaction mass of reactants free of free carbon that produces free carbon and an intermetallic compound under diamond synthesis conditions and subjecting the reaction mass to diamond synthesis conditions to produce free carbon and the intermetallic compound.
2. The method according to claim 1, wherein the reactants include a mixture of a Group IVa, Va, VIa or VIIa metal or metal carbide; and aluminum carbide.
3. The method according to claim 2, wherein the metal is selected from Zr, Hf, Ti, V, Ta, Nb, Cr, Mo, W, Fe, Co, Cu and Ni.
4. The method according to claim 2, wherein the metal is selected from Ni, Cr, Nb, Ti, and Ta.
5. The method according to claim 2, wherein the reactants include an additional carbide.
6. The method according to claim 5, wherein the additional carbide is tungsten carbide.
7. The method according to claim 1, wherein the reactants are a metal or metal carbide and silicon carbide.
8. The method according to claim 1, wherein the reactants are a metal or metal carbide and boron carbide.
9. The method according to claim 1, wherein the reactants are a metal or metal nitride and silicon carbide.
10. The method according to claim 1, wherein the reactants are a metal or metal nitride and $Al_4C_3$.
11. The method according to claim 7 in which the metal is a Group IVa or Va metal.
12. The method according to claim 7 in which the metal is Ti, V, Nb or Ta.
13. The method according to claim 1 wherein the diamond containing material produced is polycrystalline diamond (PCD) and the reaction mass contains diamond particles in an amount sufficient to allow PCD to be produced.
14. The method according to claim 13, wherein the diamond content in the PCD exceeds 70 volume %.
15. The method according to claim 13, wherein the diamond content in the PCD exceeds 80 volume %.
16. The method according to claim 1, wherein the diamond content in the diamond containing material produced does not exceed 70 volume %.
17. The method according to claim 16, wherein the diamond content in the diamond containing material produced does not exceed 40 volume %.
18. The method according to claim 16, wherein the diamond content in the diamond containing material produced does not exceed 30 volume %.
19. The method according to claim 1 in which the reactants are provided in particulate form and are intimately mixed prior to being subjected to the diamond synthesis conditions.
20. The method according to claim 1 wherein the second phase contains more than one intermetallic compound.
21. The method according to claim 1 wherein the second phase consists essentially of the intermetallic compound or compounds.
22. The method according to claim 1, wherein the free carbon is transformed to diamond.

* * * * *